US007111081B2

(12) United States Patent
Suzuki et al.

(10) Patent No.: US 7,111,081 B2
(45) Date of Patent: Sep. 19, 2006

(54) STORAGE DEVICE HAVING PLURAL DISK UNITS AND PLURAL DISK CONTROL UNITS CONNECTED BY CONTROL SIGNAL TRANSMISSION CABLES THAT CARRY DIFFERENT CONTROL SIGNALS

(75) Inventors: Hiroshi Suzuki, Sagamihara (JP); Hiromi Matsushige, Hiratsuka (JP); Masato Ogawa, Chigasaki (JP); Tomokazu Yokoyama, Fujisawa (JP); Testuya Inoue, Odawara (JP)

(73) Assignee: Hitachi, Ltd., Tokyo (JP)

(*) Notice: Subject to any disclaimer, the term of this patent is extended or adjusted under 35 U.S.C. 154(b) by 124 days.

(21) Appl. No.: 10/849,205

(22) Filed: May 20, 2004

(65) Prior Publication Data
US 2005/0204364 A1    Sep. 15, 2005

(30) Foreign Application Priority Data
Mar. 12, 2004    (JP)    ............................. 2004-070751

(51) Int. Cl.
*G06F 13/00*    (2006.01)

(52) U.S. Cl. ............................ 710/2; 710/74; 710/300; 711/111

(58) Field of Classification Search .................... 710/2, 710/7, 20, 33, 52, 105, 300; 709/234; 711/118
See application file for complete search history.

(56) References Cited

U.S. PATENT DOCUMENTS 5,465,251 A    11/1995    Judd et al.
5,596,169 A    1/1997    Baker et al.
5,949,754 A    9/1999    Takahashi
5,949,984 A *  9/1999    Fujitaka ....................... 703/23
6,226,701 B1 * 5/2001    Chambers et al. ........... 710/105
6,691,200 B1   2/2004    Zhou et al.
6,875,023 B1   4/2005    Brown
2002/0191537 A1* 12/2002  Suenaga ...................... 370/221
2004/0230711 A1  11/2004  Moon et al.

FOREIGN PATENT DOCUMENTS

JP    08179894 A *  7/1996
JP    09312178 A *  12/1997

\* cited by examiner

*Primary Examiner*—Ilwoo Park
(74) *Attorney, Agent, or Firm*—Mattingly, Stanger, Malur & Brundidge, P.C.

(57) ABSTRACT

A storage device that is communicably connected to a host computer includes a plurality of disk units for storing data from the host computer. Each of the disk units includes a plurality of hard disks and is connected to one of a plurality of ports. A plurality of disk unit control units control the plurality of disk units, and each of the disk unit control units includes a memory for temporarily holding data from the host computer. A plurality of control signal transmission cables transmit control signals from the disk unit control units to the disk units. At least one of the control signal transmission cables is connected to at least two of the disk unit control units and transmits different control signals to at least two of the disk units. This enables device miniaturization and reduced costs for the storage device without a drop in reliability, even when a variety of devices are mounted in a highly dense configuration.

6 Claims, 10 Drawing Sheets

STORAGE DEVICE HAVING PLURAL DISK UNITS AND PLURAL DISK CONTROL UNITS CONNECTED BY CONTROL SIGNAL TRANSMISSION CABLES THAT CARRY DIFFERENT CONTROL SIGNALS

CROSS-REFERENCE TO PRIOR APPLICATION

This application relates to and claims priority from Japanese Patent Application No. 2004-70751, filed on Mar. 12, 2004 the entire disclosure of which is incorporated herein by reference.

FIELD OF THE INVENTION

The present invention relates to a storage device that is communicably connected to a host computer.

BACKGROUND OF THE INVENTION

Figure 1:
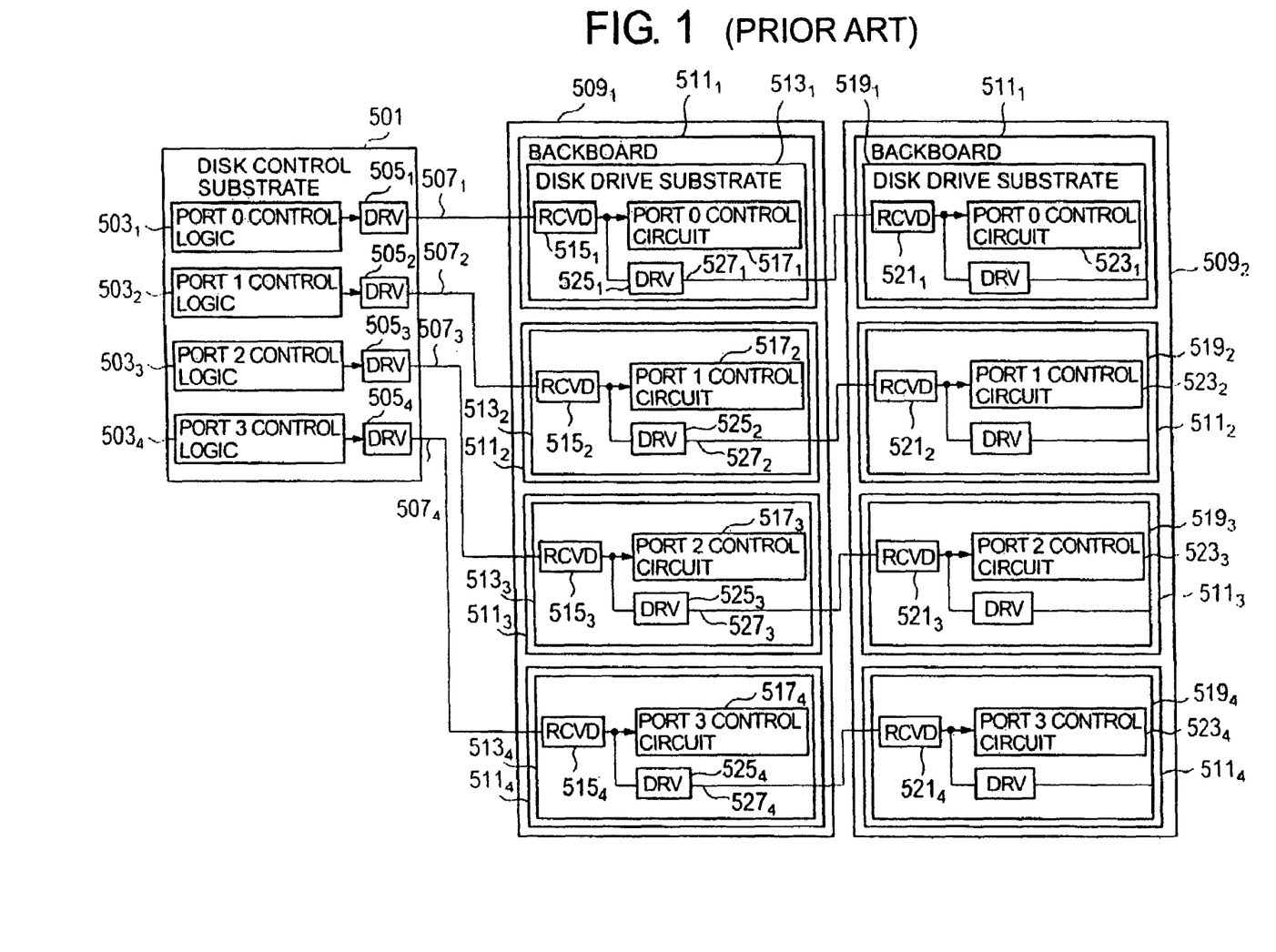
FIG. 1 is a block diagram showing the details of a circuit constitution with which a conventional storage device is provided.
Figure 2:
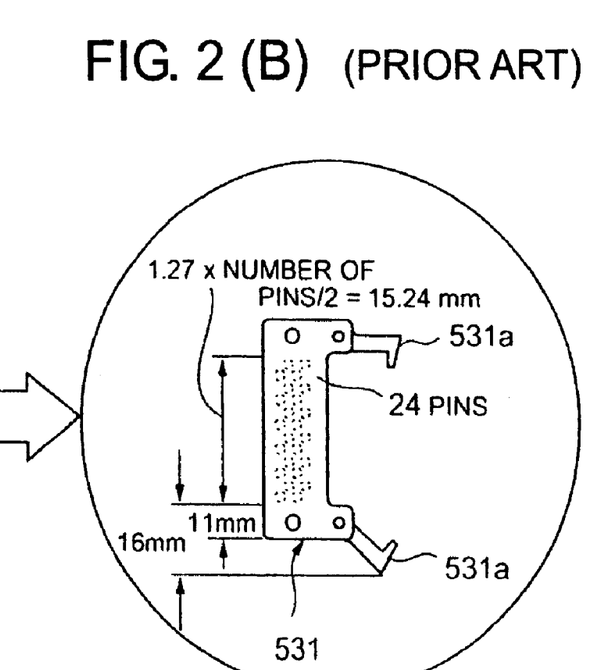
FIG. 2 is an explanatory view of a disk control substrate for mounting the port control logic circuit in FIG. 1 and FC signal connectors and port control signal connectors that are disposed on the disk control substrate.
Figure 2A:
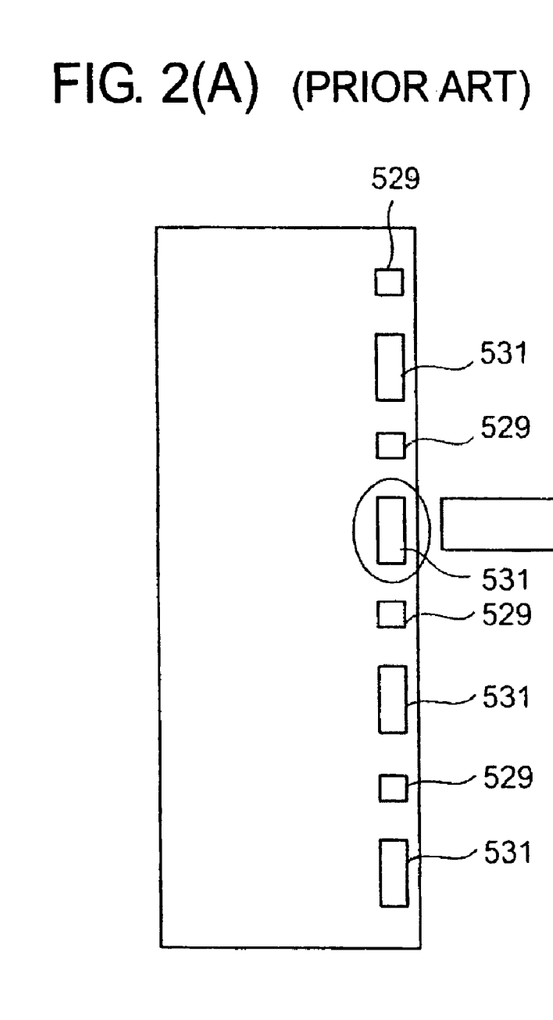

Conventionally, in a storage device, port control logic circuits ($503_1$ to $503_4$) of respective ports (ports 0 to 3) and drivers ($505_1$ to $505_4$), all of which are mounted on a disk control substrate 501, and receiver drivers ($515_1$ to $515_4$) and port control circuits ($517_1$ to $517_4$), all of which are mounted on respective disk drive substrates ($513_1$ to $513_4$) on respective backboards ($511_1$ to $511_4$) of a disk drive unit $509_1$, are connected by respective port-control signal cables ($507_1$ to $507_4$), as shown in FIG. 1. Further, respective port control logic circuits ($503_1$ to $503_4$) and respective drivers ($505_1$ to $505_4$), receiver drivers ($521_1$ to $521_4$) and port control circuits $523_1$ to $523_4$), all of which are mounted on respective disk drive substrates ($519_1$ to $519_4$) on respective backboards ($511_1$ to $511_4$) of a disk drive unit $509_2$, are connected via drivers ($525_1$ to $525_4$) and separate port control signal cables ($527_1$ to $527_4$), all of which are mounted on respective disk drive substrates ($519_1$ to $519_4$). Further, as shown in FIG. 2(a), four of each of an FC signal connector 529 and a port control signal connector 531 are arranged alternately along one edge of the disk control substrate 501.

Figure 3:
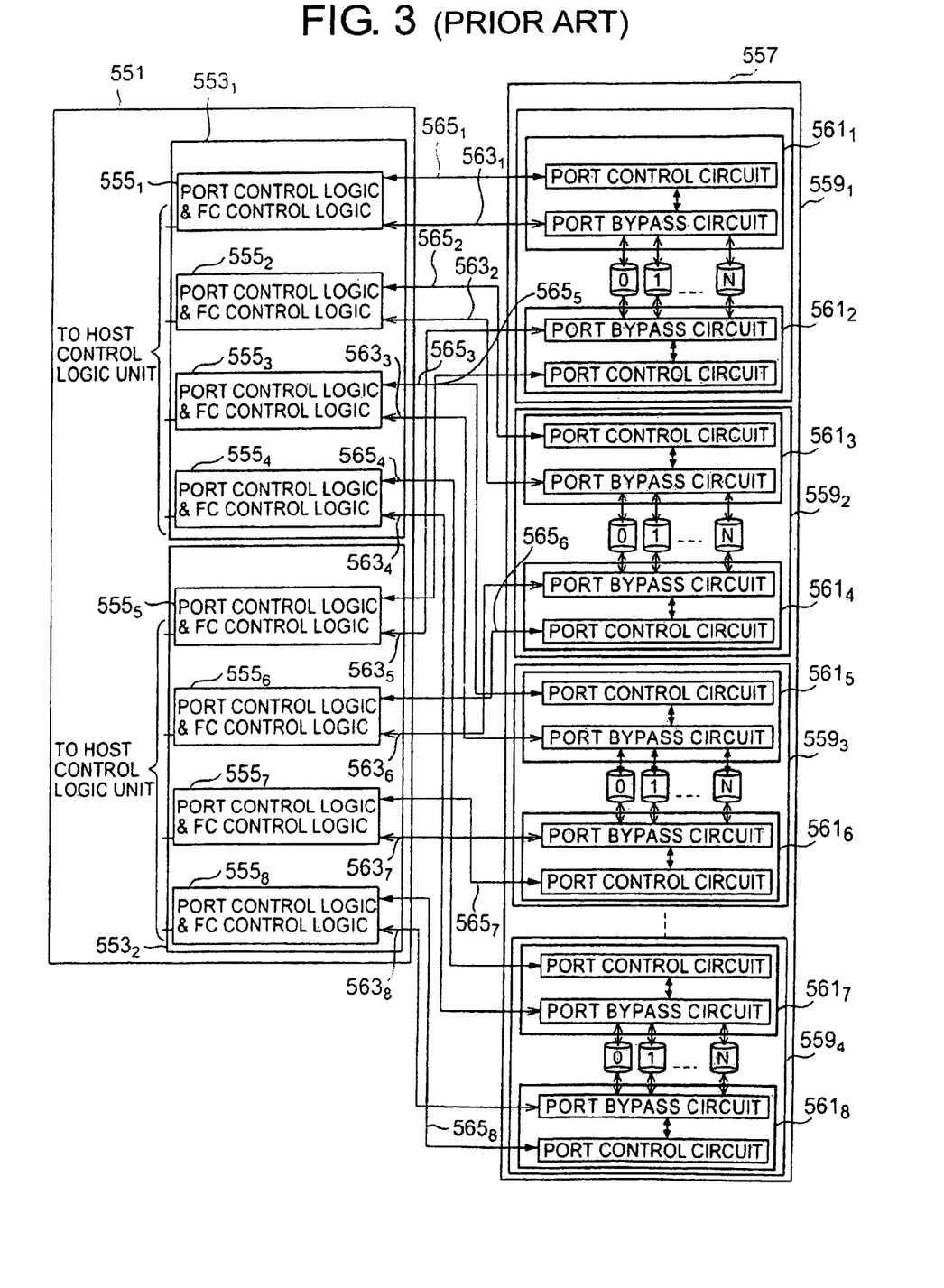
FIG. 3 is a block diagram showing an additional detailed circuit constitution of the conventional storage device.

Furthermore, in the case of the conventional storage device detailed above, a plurality (two in FIG. 3) of disk control substrates $553_1$, $553_2$ are mounted in the disk control unit 551, as shown in FIG. 3, and a total of eight port control logic/FC control logic circuits ($555_1$ to $555_8$) are mounted on each of the disk control substrates ($553_1$, $553_2$) respectively so that there are four ports on each substrate. Next, the respective port control logic/FC control logic circuits ($555_1$ to $555_8$) and individual disk drive substrates ($561_1$ to $561_8$), which are arranged on respective backboards ($559_1$ to $559_4$) in a disk drive unit 557, are connected by two types of cable, which are Fiber Channel Interface FC signal cables (hereinafter abbreviated to 'FC signal cables') ($563_1$ to $563_8$) and port control signal cables ($565_1$ to $565_8$). Here, the port control signal cables ($565_1$ to $565_8$) are cables for transmitting logic level signals required for controlling and monitoring the Fiber Channel Interface LSI and logic level signals required for monitoring the fault status of the parts and power supplies that constitute the disk drive unit 557.

However, in the case of the storage device with the above constitution, the width region (mounting width) on the disk control substrate 501 that is required to connect the port control signal cables ($565_1$ to $565_8$), which is occupied by a plurality (four in FIG. 2) of port control signal connectors (531) that are arranged in a row on the disk control substrate 501, is approximately 50 mm and comparatively large, as shown in FIG. 2(b). For this reason, when port control signal connectors (531) for four ports are mounted on the same disk control substrate 501, substantially the whole edge of the disk control substrate 501 is then used. This is because a space of about 32 mm is required in order to move a pair of connector lock levers 531a of the port control signal connector (531) shown in FIG. 2(b) along the surface of the disk control substrate 501 when attaching or detaching the port control signal cables ($565_1$ to $565_8$). Therefore, the number of respective port control logic/FC control logic circuits ($555_1$ to $555_8$) mounted on the respective control substrates 501 is subject to restrictions and, hence, the mount number of the port control logic/FC control logic circuits ($555_1$ to $555_8$) cannot be increased by exceeding the restricted number.

In addition, in the case of the storage device with the above constitution, port control signal cables ($565_1$ to $565_8$), which connect the respective port control logic/FC control logic circuits ($555_1$ to $555_8$) and the disk drive substrates ($561_1$ to $561_8$) (mounted on the disk drive unit 557), are required for each port, and each port control signal cable ($565_1$ to $565_8$) is wired on each disk drive substrate ($561_1$ to $561_8$). Moreover, when the mount number of HDD (hard disk drives) is maximized in the disk drive unit 557, the disk drive substrates ($561_1$ to $561_8$) and HDD are mounted with high density. Therefore, the distance between the respective disk drive substrates ($561_1$ to $561_8$) is then short, meaning that the port control signal cables ($565_1$ to $565_8$) and FC signal cables ($563_1$ to $563_8$) are intertwined within a short interval. As a result, the port control signal cable of port 0, for example, is wrongly connected to the connector of another port, which means the problems of the device not operating normally readily occurs.

As is clear from the above description, conventionally, the number of port control logic/FC control logic circuits ($555_1$ to $555_8$) that can be mounted on the disk control substrate (501) is restricted by the port control signal connectors, and, even with high integration of the port control logic/FC control logic circuits (FC control logic control LSI) ($555_1$ to $555_8$) mounted on the disk control substrate (501), there is the problem that the number of controlled ports cannot be increased. In addition, because, in the disk drive unit (557), the same cables are wired in very close positions in accordance with the increase in the number of cables and the high density mounting, there is the problem that, as described above, an erroneous connection is easily made. Further, within a storage device with an increased number of connected cables, a space for wiring and fixing the cables is required, and there is therefore the problem that the storage device cannot be miniaturized. Further, there is also the problem that it is difficult to reduce the costs of the storage device due to the above-mentioned problems.

SUMMARY OF THE INVENTION

Accordingly, it is a first object of the present invention to enable device miniaturization and reduced costs for the storage device without a drop in reliability even when a variety of devices are mounted highly densely therein.

Furthermore, it is a second object of the present invention to make it possible to prevent the erroneous wiring and erroneous connection of cables for connecting respective devices in the storage device even when a variety of devices are mounted highly densely therein.

The storage device according to the present invention is a storage device that is communicably connected to a host computer, comprising: a plurality of disk units for storing data from the host computer, each of the disk units comprising a plurality of hard disks and being connected to one of a plurality of ports; a plurality of disk unit control units for controlling the plurality of disk units, each of the disk unit control units being provided for each of the ports and comprising a memory for temporarily holding data from the host computer; and a plurality of control signal transmission cables for transmitting control signals from the disk unit control units to the disk units, wherein at least one of the control signal transmission cables is connected to at least two of the disk unit control units and transmits different control signals to at least two of the disk units.

In a preferred embodiment, each of the disk units comprises a port control circuit and a port bypass circuit in addition to the plurality of hard disks.

In a preferred embodiment, each of the disk unit control units comprises: a port control logic circuit for outputting a port control signal to the port control circuit of each of the disk units; and a fiber channel control logic circuit for outputting a fiber channel control signal to the port bypass circuit of each of the disk units.

In a preferred embodiment, said at least one of the control signal transmission cables is a port control signal cable for transmitting different port control signals from the port control logic circuits of said at least two of the disk unit control units to the port control circuits of said at least two of the disk units.

Further, in another preferred embodiment, said at least one of the control signal transmission cables is a fiber channel control signal cable for transmitting different fiber channel control signals from the fiber channel control logic circuits of said at least two of the disk unit control units to the port bypass circuits of said at least two of the disk units.

In a preferred embodiment, each of the disk units further comprises: a plurality of selectors that are used in order to change the number of ports that the storage device has, the selectors being connected to each of the control signal transmission cables and the respective port control circuits.

In a preferred embodiment, each of the selectors comprises a select input terminal to which a logic level "H" or logic level "L" voltage signal is applied, the selection of whether to capture a port control signal from each of the port control logic circuits being made in accordance with the logic level of the voltage signal thus applied to the select input terminal.

Moreover, in a preferred embodiment, each of the control signal transmission cables is connected to each of the disk control units via a plurality of connectors arranged on a disk control substrate for bearing the disk unit control units; and each of the connectors comprises: signal pins that allow at least two ports' worth of the disk unit control units to be connected thereto; and a lock mechanism for attaching and fixing each of the control signal transmission cables.

DETAILED DESCRIPTION OF THE PREFERRED EMBODIMENT

An embodiment of the present invention will be described below in detail with reference to the drawings.

Figure 4:
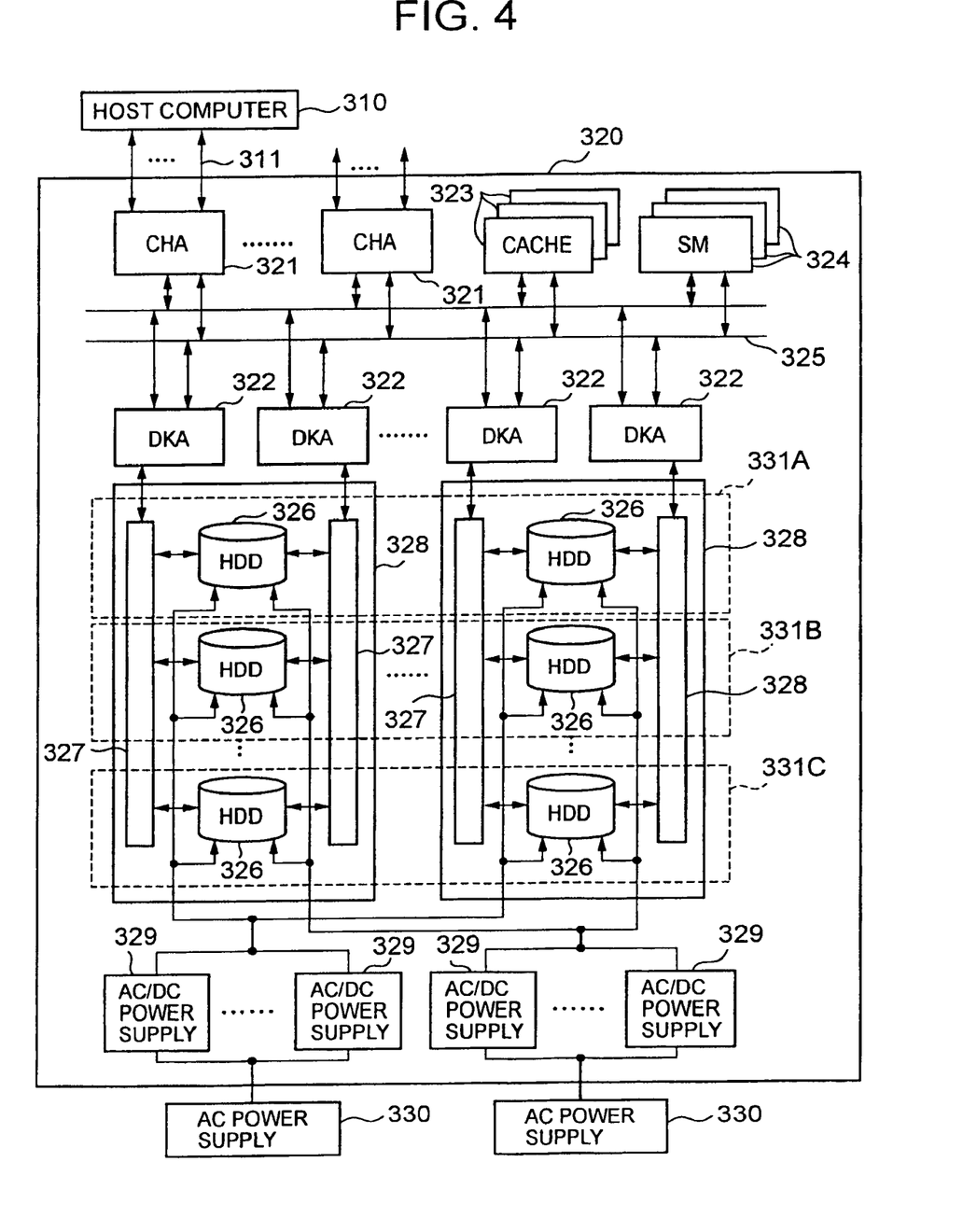
FIG. 4 is a block diagram showing the overall constitution of a storage system to which the present invention is applied.

FIG. 4 is a block diagram showing the overall constitution of a storage system to which the present invention is applied.

The storage system 320 shown in FIG. 4 comprises one or more channel adapters (CHA) 321, one or more disk adapters (DKA) 322, one or more cache memories (CACHE) 323, one or more shared memories (SM) 324, one or more common paths 325, a plurality of physical storage devices (that is, storage devices) 326, one or more connection control circuits 327, one or more motherboards 328, and one or more main supply devices 329. A hard disk drive, nonvolatile semiconductor memory, or another type of device can be adopted for the physical storage devices 326. However, hard disk drives (hereinafter abbreviated to 'HDD') are typically adopted. HDD will also be adopted in the following description.

The channel adaptors 321, disk adapters 322, cache memories 323, and shared memories 324 are connected to one another by means of the common path 325. The common path 325 may be provided in duplicate as illustrated (or as a multiplicity) in order to prepare for failure of the common path 325. The channel adaptors 321 are connected to one or more host computers 310 or other storage systems (omitted from the illustration) by means of connecting wires 311. The channel adaptors 321 control data transfers between the host computer 310 or another storage system (not illustrated), and the cache memories 323. The disk adapters 322 control data transfers between the cache memories 323 and HDD 326. The cache memories 323 are memories for the temporary storage of data received from the host computer 310 or another storage system (not illustrated) or data that is read from the HDD 326. The shared memories 324 are memories that are shared by all the channel adapters 321 and all the disk adapters 322 in the storage system 320. The shared memories 324 mainly store and hold various control and management information that is employed by the channel adaptors 321 and disk adapters 322.

The motherboard 328 is an electrical circuit substrate comprising a data transfer wiring network for the HDD 326 and an electrical supply wiring network. A plurality of HDD 326 and two (or more) mutually interchangeable connection control circuits 327 are mounted on respective motherboards 328. The two respective connection control circuits 327 on the respective motherboards 328 communicably connect the plurality of HDD 326 on the motherboard 328 to each of the mutually interchangeable two disk adapters 322. A Fiber Channel Switch, a port bypass circuit, or the like, for example, is adopted for this purpose. The respective connection control circuits 327 and the plurality of HDD 326 are electrically connected via the wiring network on the respective motherboards 328. Further, the respective connection control circuits 327 and respective disk adapters 322 are electrically connected via a multiplicity of cables, for example. Data transfers are executed between the plurality of HDD 326 and the respective disk adapters 322 via the respective connection control circuits 327. A set, which is comprised of a connection control circuit 327 and disk adapter 322, is provided in duplicate for each motherboard 328, whereby the stability with respect to failure is improved. As will be described in specific terms subsequently, each HDD 326 is housed within a canister (that is, an enclosure) that can be mounted on or detached from the motherboard 328. The pack of HDD 326 housed within this canister or enclosure can be called the 'HDD pack' or 'HDD enclosure'. In the following description, a term such as 'HDD pack' will be used.

Each of the reference symbols 331A, 331B, and 331C denote a group of HDD 326 according to the principles of RAID, which is known as a 'parity group' (or 'error correction group') according to the principles of RAID. Two or more HDD 326 that belong to the same parity group 331A, 331B, or 331C are mounted on different motherboards and have data with redundancy stored thereon so that, even if one of the HDD 326 should fail, the data on the failed HDD 326 can be recovered by using the data on the other remaining HDD 326. Two or more HDD 326 belonging to the same parity group 331A, 331B or 331C desirably have exactly the same storage capacity, and, from that standpoint, are normally integrated in HDD of the same model from the same manufacturer, and therefore the same is also true for power supply specifications and data transfer interfaces.

The power supply system of the storage system 320 comprises one or more AC/DC power supply circuits 329. The respective AC/DC power supply circuits 329 receive an input of AC power from an external AC power supply (a commercial 200V_AC power supply, for example) 330, convert this power supply into DC electrical power of a predetermined voltage (56V, 48V, 24V, or 12V, or the like, for example), and then supply the converted DC supply to the plurality of HDD packs 333 on the motherboard 328 and to other circuits. The respective AC/DC power supply circuits 329 and the plurality of HDD packs 333 on the respective motherboards 328 are connected via a power supply wiring network on each motherboard 328. In preparation for power failure, mutually interchangeable duplicate (or multiple) AC power supplies 330 are used. Duplicate AC/DC power supply circuits 329 or a larger number of multiple AC/DC power supply circuits 329 connected to each AC power supply 330 so as to be mutually interchangeable. In the illustrated example, the respective AC/DC power supply circuits 329 are shared by a plurality of motherboards 328. However, as a modified example, one or more dedicated AC/DC power supply circuits may be provided for each motherboard 328.

Further, a port relating to the present invention that is described below denotes a port between the respective disk adapters 322 above and respective motherboards (that is, disk drive units) 328.

Figure 5:
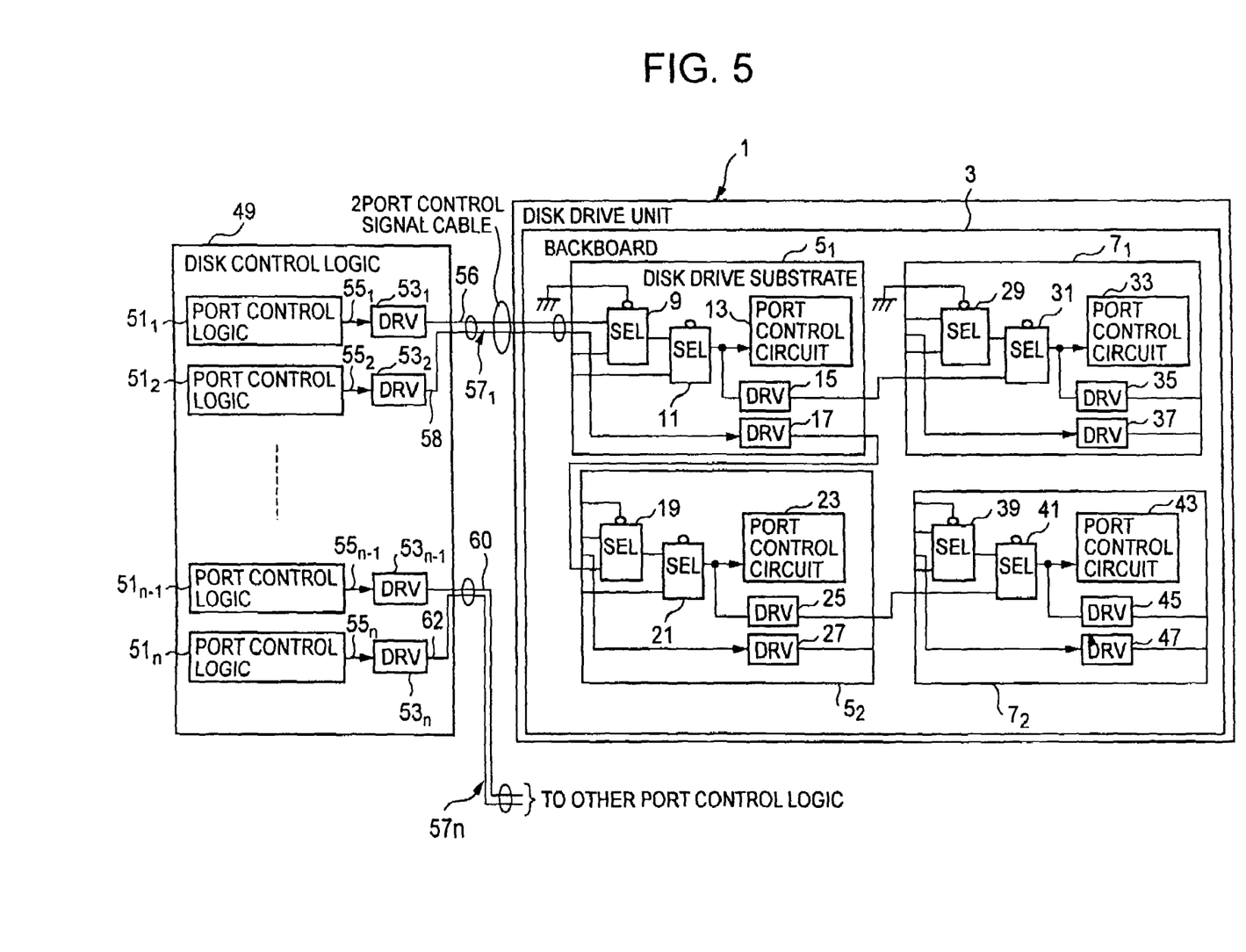
FIG. 5 is a block diagram showing the details of the circuit constitution with which the storage device according to an embodiment of the present invention is provided.

FIG. 5 is a block diagram showing the details of the circuit constitution with which the storage device according to an embodiment of the present invention is provided.

In FIG. 5, a disk drive unit (sometimes also described as a 'disk array' or 'disk storage unit'; the same below) 1 comprises a backboard 3. A basic unit of a disk drive substrate corresponding with port 0 (hereinafter described as the 'basic disk drive substrate') $5_1$, and two basic disk drive substrates of a basic disk drive substrate $5_2$ corresponding with port 1, which is a port adjacent to port 0, for example, are arranged on the backboard 3. In addition to the parts described above, an extension of the disk drive substrate corresponding with port 0 (hereinafter described as the 'extension disk drive substrate') $7_1$, and two extension disk drive substrates of an extension disk drive substrate $7_2$ corresponding with port 1 are also arranged on the backboard 3.

Two selectors 9 and 11, each with two input terminals, one output terminal, and a select signal input terminal, and a port control circuit 13 and two drivers 15 and 17 are arranged on the basic disk drive substrate $5_1$ that constitutes the basic disk drive substrate of port 0. Similarly to the basic disk drive substrate $5_1$, two selectors 19 and 21 each with two input terminals and one output terminal, and a port control circuit 23 and two drivers 25 and 27 are arranged on the basic disk drive substrate $5_2$ that constitutes the basic disk drive substrate of port 1. Further, similarly to the basic disk drive substrates $5_1$ and $5_2$, two selectors 29 and 31 each with two input terminals and one output terminal, and a port control circuit 33 and two drivers 35 and 37 are arranged on the extension disk drive substrate $7_1$, which is an extension disk drive substrate corresponding with port 0. Further, similarly to the basic disk drive substrates $5_1$ and $5_2$ and the extension disk drive substrate $7_1$, two selectors 39 and 41 each with two input terminals and one output terminal, and a port control circuit 43 and two drivers 45 and 47 are arranged on the extension disk drive substrate $7_2$, which is an extension disk drive substrate corresponding with port 1. Further, the selection may be switched depending on whether the select signal input terminals of the selectors (9, 11, 19, 21, 29, 31, 39, and 41) are open or earthed, that is, depending on whether a logic level "H" voltage signal is applied to these select signal input terminals or a logic level "L" voltage signal is applied thereto.

On the other hand, the disk control logic unit 49 has the same circuit constitution as the disk adapter that the storage device comprises and is provided with a plurality of port control logic circuits $51_1$, $51_2$, ..., $51_{n-1}$, $51_n$ with the same constitution provided in correspondence with the individual ports (port 0, port 1, ..., port n-1, port n), and a plurality of drivers $53_1$, $53_2$, $53_{n-1}$, $53_n$ with the same constitution each of which is disposed in correspondence with respective port control logic circuits $51_1$, $51_2$, ..., $51_{n-1}$, $51_n$. Each of the port control logic circuits $51_1$, $51_2$, ..., $51_{n-1}$, and $51_n$ and the respective drivers $53_1$, $53_2$, ..., $53_{n-1}$, and $53_n$ are individually connected, and the respective drivers $53_1$, $53_2$, ..., $53_{n-1}$, and $53_n$ and the respective basic disk drive substrates ($5_1$, $5_2$) (provided for each port) are individually connected by respective port control signal cables (56, bx;158, ..., 60, and 62).

According to this embodiment, in order to connect the disk control logic unit 49 and disk drive unit 1, a 2-port control signal cable ($57_1$, $57_n$), which has a constitution in which two port control signal cables (port control signal cable 56, port control signal cable 58, port control signal cable 60, and port control signal cable 62, for example) of adjacent ports (port 0, port 1, port n-1, and port n, for example) among the above-mentioned (plurality of) port control signal cables (56, 58, . . . , 60, and 62) are bundled to form one cable, is adopted.

A port control signal outputted by the port control logic circuit $51_1$ (corresponding with port 0) is inputted to selector 9 via the first input terminal of selector 9 (of the basic disk drive substrate $5_1$) via the driver $53_1$ and the port control signal cable 56 contained in the 2-port control signal cable $57_1$. Selector 9 is for selecting whether to input a control signal transmitted via a cable such as the 2-port control signal cable ($57_1$, $57_n$) or to input a signal via the backboard 3, for example, this selection being determined by the mounting (connection) position of the disk drive substrate ($5_1$ on the backboard 3. The select signal input terminal of the selector 9 is earthed in a predetermined position on the backboard 3 and the second input terminal is open, and a logic level "L" voltage signal is applied via the select signal input terminal. The selector 9 outputs, via the output terminal thereof, the above-mentioned port control signal, which has been inputted via the first input terminal, to the first input terminal of the selector 11. First and second input terminals, which are input terminals for the control signals of the selector 9, are allocated to one of the main edges of the disk drive substrate $5_1$, for example.

The selector 11 also permits selection of whether to input a control signal that is transmitted via a cable such as the 2-port control signal cable ($57_1$, $57_n$), or to input a signal via the backboard 3, for example, the selection being determined by the mounting (connection) position of the disk drive substrate ($5_1$) on the backboard 3. The select signal input terminal and second input terminal of the selector 11 are open and a logic level "H" voltage signal is applied via the select signal input terminal. The selector 11 outputs, via the output terminal thereof, the port control signal thus outputted by the selector 9 via the first input terminal to the port control circuit 13 and the driver 15. The port control circuit 13 inputs the port control signal and executes a predetermined control operation based on the port control signal. Meanwhile, the driver 15 outputs the port control signal to the second input terminal of the selector 31 (of the extension disk drive substrate $7_1$).

The selector 29 (of the extension disk drive substrate $7_1$) earths the select signal input terminal and applies a logic level "L" voltage signal, and the first and second input terminals are both open. Further, the output terminal of the driver 35 (of the extension disk drive substrate $7_1$) and the input and output terminals of the driver 37 are open respectively. The selector 31 outputs, via the output terminal thereof, the port control signal that is inputted via the second input terminal to the port control circuit 33 and driver 35. The selectors 29 and 31 also permit selection of whether to input a control signal that is transmitted via a cable such as the above-mentioned 2-port control signal cable ($57_1$, $57_n$), or to input a signal via the backboard 3, for example, the selection being determined by the mounting (connection) position of the (extension) disk drive substrate ($7_1$) on the backboard 3. The port control circuit 33 has the port control signal inputted thereto and executes a predetermined control operation on the basis of the port control signal.

Next, the port control signal that is outputted by the port control logic circuit $51_2$ (corresponding with port 1) is inputted to selector 19 via the second input terminal of the selector 19 (of the basic disk drive substrate $5_2$) via the driver $53_2$, the port control signal cable 58 that constitutes the 2-port control signal cable $57_1$, and the driver 17 (of the basic disk drive substrate $5_1$). The select signal input terminal of the selector 19 is open in a predetermined position on the backboard 3 and the first input terminal is open, and a logic level "H" voltage signal is applied via the select signal input terminal. The selector 19 outputs, via the output terminal thereof, the port control signal thus inputted via the second input terminal thereof to the first input terminal of the selector 21.

The select signal input terminal and the second input terminal of the selector 21 are open and a logic level "H" voltage signal is applied thereto via the select signal input terminal. The selector 21 outputs, via the output terminal thereof, the port control signal thus outputted by the selector 19 via the first input terminal to the port control circuit 23 and driver 25. The selectors 19 and 21 also permit selection of whether to input a control signal that is transmitted via a cable such as the above-mentioned 2-port control signal cable ($57_1$, $57_n$) or to input a signal via the backboard 3, for example, this selection being determined by the mounting (connection) position of the (basic) disk drive substrate ($5_2$) on the backboard 3. The port control circuit 23 inputs the port control signal and executes a predetermined control operation on the basis of the port control signal. Meanwhile, the driver 25 outputs the port control signal to the second input terminal of selector 41 (of the extension disk drive substrate $7_2$) Further, the input terminal of the driver 27 and the output terminal are both open.

The select signal input terminal, first input terminal, and second input terminal of the selector 39 (of the extension disk drive substrate $7_2$) are open. Further, the output terminal of driver 45 (of the extension disk drive substrate $7_2$) and the input and output terminals of driver 47 are open respectively. The select signal input terminal of the selector 41 is open and a logic level "H" voltage signal is applied via the select signal input terminal. The selector 41 outputs, via the output terminal thereof, the port control signal thus inputted via the second input terminal to the port control circuit 43 and driver 45. The port control circuit 43 has the port control signal inputted thereto and executes a predetermined control operation based on the port control signal. The selectors 39 and 41 also permit selection of whether to input a control signal that is transmitted via a cable such as the above-mentioned 2-port control signal cable ($57_1$, $57_n$) or to input a signal via the backboard 3, for example, this selection being determined by the mounting (connection) position of the (extension) disk drive substrate ($7_2$) on the backboard 3.

Further, the port control signal outputted via the port control logic circuit $51_{n-1}$ (corresponding with port n-1) is transmitted to a basic disk drive substrate $5_{n-1}$ (not shown) via the driver $53_{n-1}$ and the port control signal cable 60 of the 2-port control signal cable $57_n$. Further, the port control signal outputted by the port control logic circuit $51_n$ (corresponding with port n) is transmitted to the basic disk drive substrate $5_n$ (not shown) via the driver $53_n$ and the port control signal cable 62 that constitutes the 2-port control signal cable $57_n$.

Figure 6A:
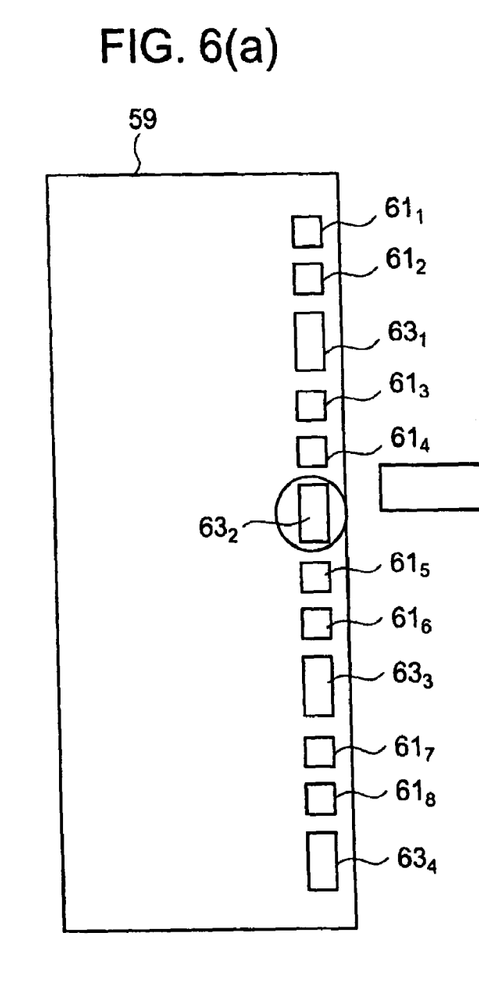
FIG. 6 is an explanatory view of a disk control substrate for mounting the port control logic circuit in FIG. 5 and FC signal connectors and a 2-port control signal connector that are disposed on the disk control substrate.

FIG. 6 is an explanatory view of a disk control substrate for mounting the port control logic circuits ($51_1$ to $51_n$) in FIG. 5, and FC signal connectors and a 2a-port control signal connector that are disposed on the disk control substrate.

As shown in FIG. 6(*a*), FC signal connectors $61_1$ and $61_2$, a 2-port control signal connector $63_1$, FC signal connectors $61_3$ and $61_4$, a 2-port control signal connector $63_2$, FC signal connectors $61_5$ and $61_6$, a 2-port control signal connector $63_3$, FC signal connectors $61_7$ and $61_8$, and a 2-port control signal connector $63_4$, are arranged at respective predetermined intervals on the disk control substrate 59 along one edge thereof. That is, two FC signal connectors ($61_1$ to $61_8$) per single port and one 2-port control signal connector ($63_1$ to $63_4$) per single port are arranged respectively on the disk control substrate 59.

The 2-port control signal connectors ($63_1$ to $63_4$) have the same constitution and, therefore, only the 2-port control signal connector $63_1$ will be taken as an example in the following description.

Figure 6B:
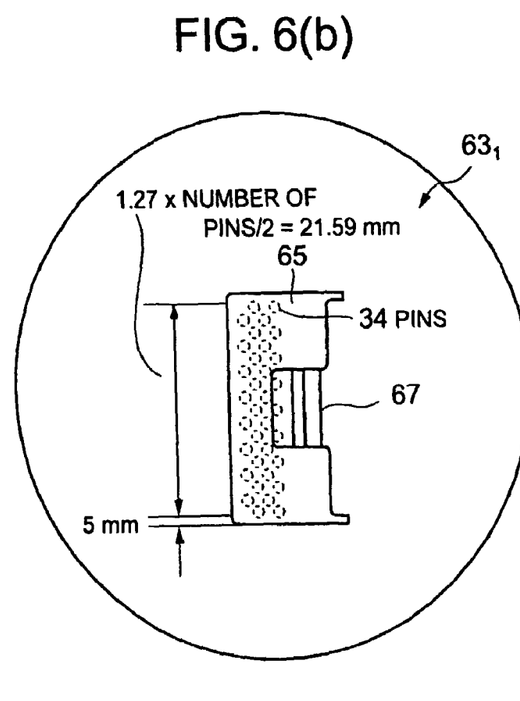

As shown in FIG. 6(b), a larger number of signal pins (34 pins, for example) than the number of signal pins for the 1-port control signal connector (24 pins, for example) are arranged in the connector main body 65 of the 2-port control signal connector $63_1$ in order that control signals for two ports are made to correspond with a single 2-port control signal connector ($63_1$). Further, a connector lock mechanism 67 for fixing the connector main body 65 to the disk control substrate 59 is disposed at the top of the connector main body 65. Accordingly, the width of the connector main body 65 (22.59 mm, for example) can be established with substantially the same size as the whole width (21.59 mm, for example) of the signal pin placement region of the connector main body 65.

FIG. 7 shows a comparison of the 2-port control signal connector shown in FIG. 6 and a 1-port control signal connector.

Figure 7A:
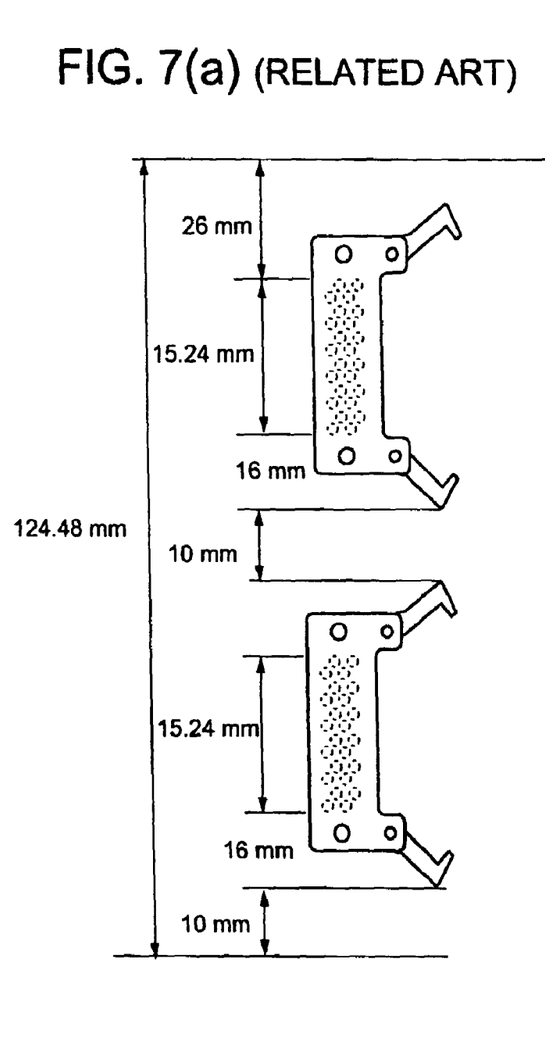
FIG. 7 provides a comparison of the 2-port control signal connector shown in FIG. 6 and a conventional 1-port control signal connector.

In FIG. 7(a), in the 1-port control signal connector 69, the number of signal pins arranged on the connector main body 71 is 24 pins, and a pair of connector lock levers $73_1$ and $73_2$ are each turnably supported on an attachment portion at both ends of the connector main body 71. In the case of a 1-port control signal connector 75 with the same constitution as the 1-port control signal connector 69, the number of signal pins arranged on the connector main body 77 is 24 pins, and a pair of connector lock levers $79_1$ and $79_2$ are each turnably supported on an attachment portion at both ends of the connector main body 77.

Figure 7B:
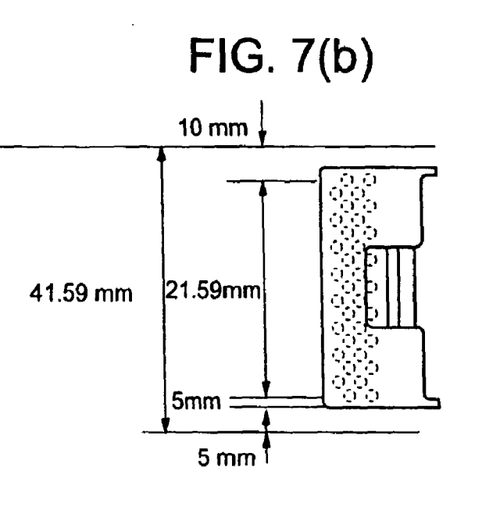

By providing the two 1-port control signal connectors (69 and 75) shown in FIG. 7(a) in a row, the functions of the single 2-port control signal connector 63 shown in FIG. 7(b) can be afforded (in other words, the result of integrating the two 1-port control signal connectors (69, 75) shown in FIG. 7(a) is a single 2-port control signal connector (63)). However, in this case, including the width of the 1-port control signal connectors 69 and 75, and the width in a case where the connector lock levers $73_1$ and $73_2$ of the 1-port control signal connector 69 and the connector lock levers $79_1$ and $79_2$ of the 1-port control signal connector 75 are open, a mounting width of 124.48 mm is required. On the other hand, when the 2-port control signal connector 63 shown in FIG. 7(b) is used, the mounting width of the disk control substrate 59 is then 41.59 mm, which is substantially one third of the above mounting width. As shown in FIG. 6, eight FC signal connectors ($61_1$ to $61_8$) and four 2-port control signal connectors ($63_1$ to $63_4$) can be mounted on the same disk control substrate (59). Accordingly, in the example shown in FIG. 6, an 8-port Fiber Channel Interface can be controlled by a single disk control substrate (59).

Figure 8:
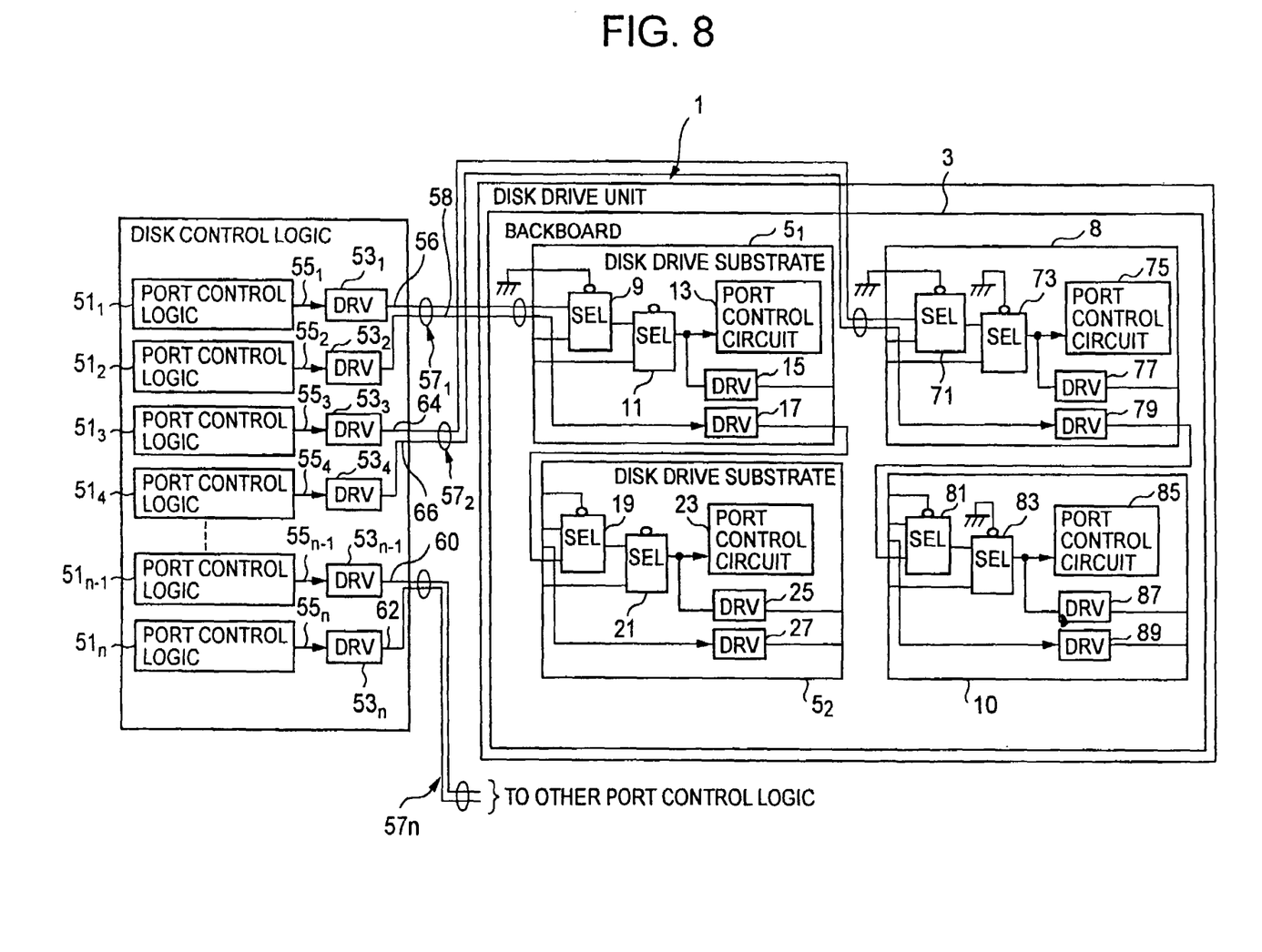
FIG. 8 is a block diagram showing the details of the circuit constitution with which a storage device according to a second modified example of an embodiment of the present invention is equipped.

FIG. 8 is a block diagram showing the details of the circuit constitution with which a storage device according to the second modified example of an embodiment of the present invention is equipped.

In this modified example, the extension disk drive substrate 8 is connected to the port control logic circuit $51_3$ of port 2 via the first input terminal of the selector 71, the port control signal cable 64 constituting the 2-port control signal cable $57_2$, and the driver $53_3$ of port 2. Further, the extension disk drive substrate 10 is connected to the port control logic circuit $51_4$ of port 3 via the second input terminal of the selector 81, the driver 79 of the extension disk drive substrate 8, the port control signal cable 66 constituting the 2-port control signal cable $57_2$, and the driver $53_4$ of port 3.

In the extension disk drive substrate 8, the select input terminal of the selector 71 is earthed and a logic level "L" voltage signal is applied, and the second input terminal is open. Further, the select input terminal of the selector 73, which is a selector for selecting whether to afford the constitution of the storage device a constitution that carries about two times the normal number of ports, for example, is also earthed and a logic level "L" voltage signal is applied, the second input terminal also being open. The output terminal of the driver 77 is also open. In the extension disk drive substrate 10, the select input terminal of the selector 81 and the first input terminal are open, and the select input terminal of the selector 83, which is a selector for selecting whether to afford the constitution of the storage device a constitution with two times the normal number of ports, for example, is also earthed and a logic level "L" voltage signal is applied, the second input terminal also being open. In addition, the output terminal of the driver 87, and the input and output terminals of the driver 89 are also open.

The port control signal outputted by the port control logic circuit $51_3$ (corresponding with port 2) is inputted to the selector 71 via the first terminal of the selector 71 (of the extension disk drive substrate 8) via the driver $53_3$, and the port control signal cable 64 of the 2-port control signal cable $57_2$. The port control signal is inputted from the output terminal of the selector 71 to the selector 73 via the first input terminal of the selector 73 and is outputted from the selector 73 to the port control circuit 75 and driver 77 via the output terminal of the selector 73.

Furthermore, the port control signal, which is outputted from the port control logic circuit $51_4$ (corresponding with port 3) is inputted to the selector 81 via the second input terminal of the selector 81 (of the extension disk drive substrate 10) via the driver $53_4$, the port control signal cable 66 of the 2-port control signal cable $57_2$, and the driver 79 (of the extension disk drive substrate 8). The port control signal is inputted from the output terminal of the selector 81 to the selector 83 via the first input terminal of the selector 83, and then outputted from the selector 83 to the port control circuit 85 and driver 87 via the output terminal of the selector 83.

Further, in FIG. 8, the same reference symbols are assigned to the same parts as those shown in FIG. 5, and therefore a detailed description thereof has been omitted.

According to an embodiment of the present invention or the modified examples thereof, in the case of the disk drive unit 1, because the mounted state (storage capacity) of the HDD (hard disk drive) remain unchanged and the settings of the selectors (29, 31, 39, 41) of the extension disk drive substrates 71 and 72 shown in FIG. 5 or the selectors (71, 73, 81, and 83) of the extension disk drive substrates 8, 10 shown in FIG. 6 are changed together with the form of cable connection, the constitution of the storage device can be freely changed to render a storage device with normal functions as shown in FIG. 5 or a high-performance storage device with two times the normal number of ports as shown in FIG. 8.

Furthermore, when the constitution is changed from the storage device with the constitution shown in FIG. 5 to the storage device with the constitution shown in FIG. 8, no new cables are used, and therefore erroneous cable connections can be prevented.

Figure 9:
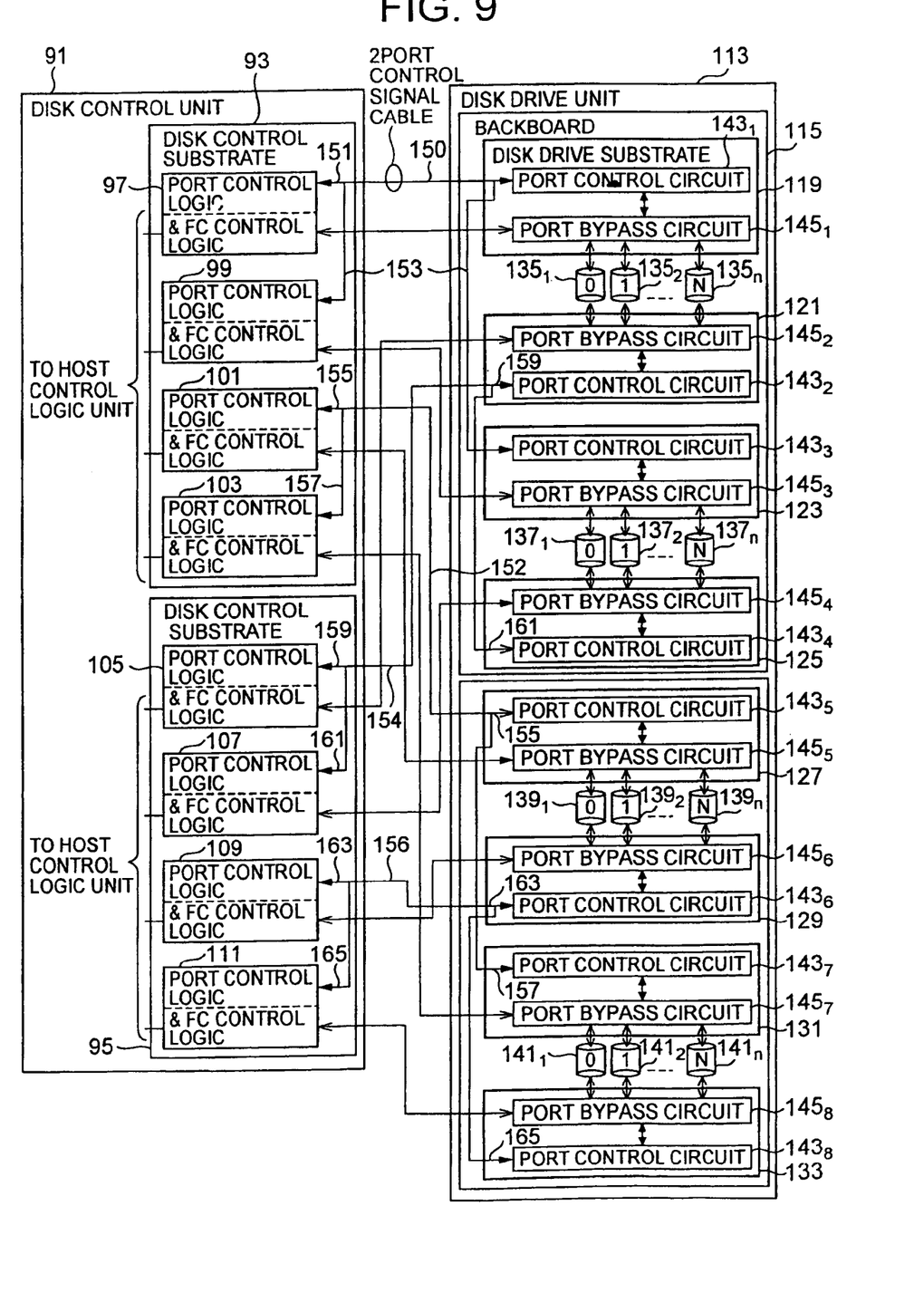
FIG. 9 is a block diagram showing an example of an additional detailed circuit constitution of the storage device when an embodiment of the present invention is applied.

FIG. 9 is a block diagram showing an example of an additional detailed circuit constitution of the storage device when an embodiment of the present invention is applied.

In the case of the storage device shown in FIG. 9, the disk control unit 91 comprises disk control substrates 93 and 95 on which one chip (LSI) is disposed for each port and respective chips 97 to 111 function as port control logic/FC control logic circuits. Hereinbelow, each of the chips 97 to 111 will be described as port control logic/FC control logic circuits 97 to 111. Meanwhile, the disk drive unit 113 comprises a plurality (two in FIG. 9) of backboards 115 and 117. The respective backboards 115 and 117 are provided with respective pluralities (four on each backboard for a total of eight in FIG. 9) of disk drive substrates 119 to 133 and a multiplicity of HDD (hard disk drives) $135_1$ to $135_n$, $137_1$ to $137_n$, $139_1$ to $139_n$, and $141_1$ to $141_n$ aligned in a plurality of columns (two columns on each backboard for a total of four in FIG. 9).

Further, a port control circuit $143_1$ and a port bypass circuit $145_1$ are arranged on the disk drive substrate 119, a port control circuit $143_2$ and a port bypass circuit $145_2$ are arranged on the disk drive substrate 121, a port control circuit $143_3$ and a port bypass circuit $145_3$ are arranged on the disk drive substrate 123, a port control circuit $143_4$ and a port bypass circuit $145_4$ are arranged on the disk drive substrate 125 respectively. Further, a port control circuit $143_5$ and a port bypass circuit $145_5$ are arranged on the disk drive substrate 127, a port control circuit $143_6$ and a port bypass circuit $145_6$ are arranged on the disk drive substrate 129, a port control circuit $143_7$ and a port bypass circuit $145_7$ are arranged on the disk drive substrate 131, and a port control circuit $143_8$ and a port bypass circuit $145_8$ are arranged on the disk drive substrate 133.

The port control logic/FC control logic circuit 97 of port 0 and the port control circuit $143_1$ on the disk drive substrate 119 are connected by a port control signal cable 151, and the port control logic/FC control logic circuit 99 of port 1 and the port control circuit $143_3$ on the disk drive substrate 123 are connected by a port control signal cable 153 respectively. The port control signal cables 151 and 153 constitute a 2-port control signal cable 150 between the disk control unit 91 and disk drive unit 113.

The port control logic/FC control logic circuit 101 of port 2 and the port control circuit $143_5$ on the disk drive substrate 127 are connected by a port control signal cable 155, and the port control logic/FC control logic circuit 103 of port 3 and the port control circuit $143_7$ on the disk drive substrate 131 are connected by a port control signal cable 157. The port control signal cables 155 and 157 constitute a 2-port control signal cable 152 between the disk control unit 91 and disk drive unit 113.

The port control logic/FC control logic circuit 105 of port 4 and the port control circuit $143_2$ on the disk drive substrate 121 are connected by a port control signal cable 159, and the port control logic/FC control logic circuit 107 of port 5 and the port control circuit $143_4$ on the disk drive substrate 125 are connected by a port control signal cable 161. The port control signal cables 159 and 161 constitute a 2-port control signal cable 154 between the disk control unit 91 and disk drive unit 113.

The port control logic/FC control logic circuit 109 of port 6 and the port control circuit $143_6$ on the disk drive substrate 129 are connected by a port control signal cable 163, and the port control logic/FC control logic circuit 111 of port 7 and the port control circuit $143_8$ on the disk drive substrate 133 are connected by a port control signal cable 165. The port control signal cables 163 and 165 constitute a 2-port control signal cable 156 between the disk control unit 91 and disk drive unit 113.

The port control logic/FC control logic circuit 97 performs communications with a host control logic unit (not shown) of a host computer or the like, for example, to exchange mutually required information. The port control logic/FC control logic circuit 97 outputs a port control signal to the port control circuit $143_1$ via the port control signal cable 153 and a port control signal cable 151 that constitutes a 2-port control signal cable 150. A process operation that is similar to that for the port control logic/FC control logic circuit 97 is also executed for the remaining port control logic/FC control logic circuits 99 to 111.

The port bypass circuits $145_1$ to $145_8$ are Fiber Channel Switch chips (FC switch chips) (hereinafter abbreviated to 'Fiber Channel Switch'), for example. By turning the Fiber Channel Switches $145_1$ to $145_8$ ON/OFF in accordance with instructions from the port control logic/FC control logic circuits (97 to 111) under the control of respective corresponding port control logic/FC control logic circuits (97 to 111), the respective HDD ($135_1$ to $135_n$, $137_1$ to $137_n$, $139_1$ to $139_n$, and $141_1$ to $141_n$) and the port control logic/FC control logic circuits (97 to 111) are disconnected/connected.

According to the above constitution, the number of cables required to connect the disk control units and disk drive units can be reduced in comparison with the conventional storage device shown in FIG. 3.

Figure 10:
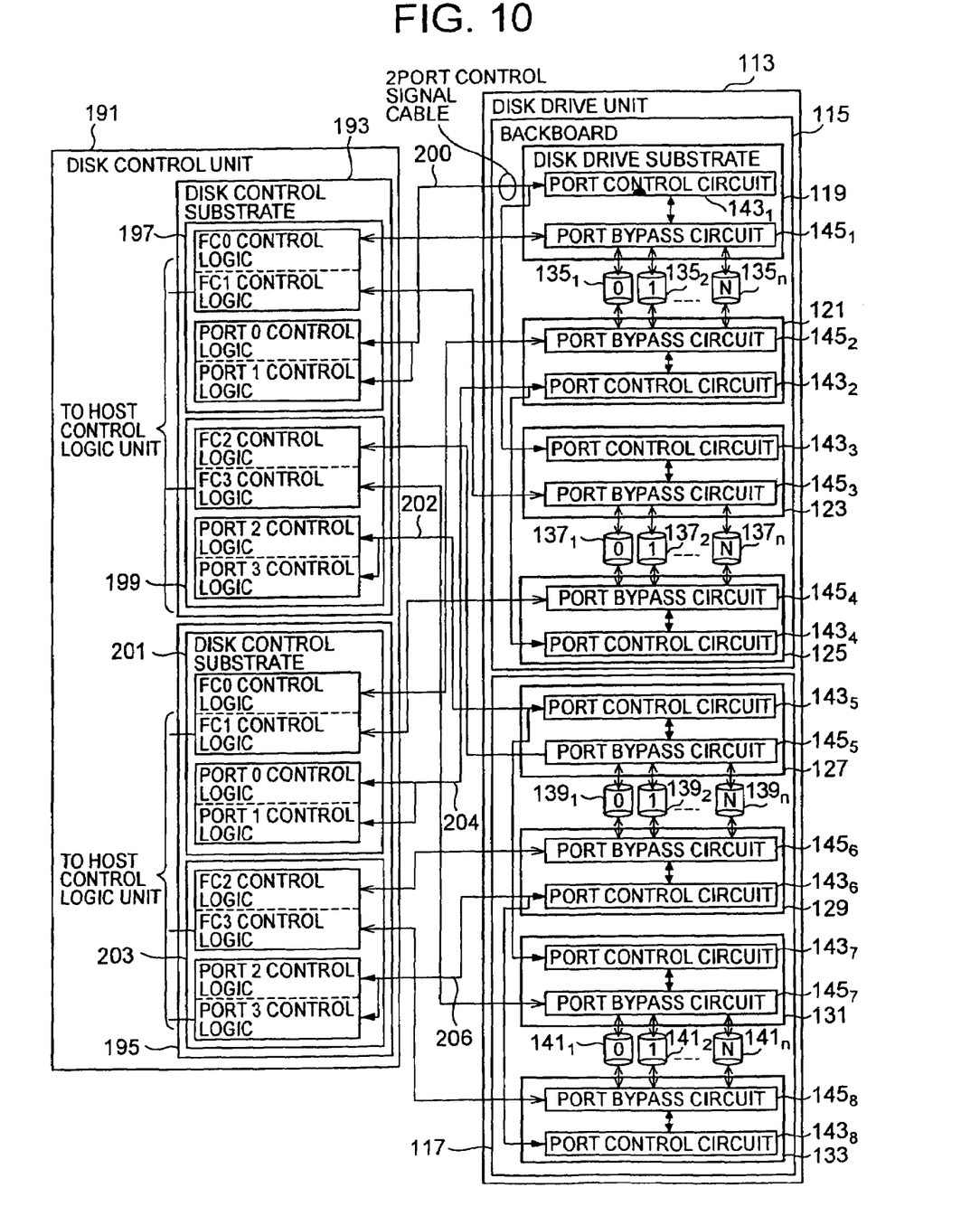
FIG. 10 is a block diagram showing another example of an additional detailed circuit constitution of the storage device when an embodiment of the present invention is applied.

FIG. 10 is a block diagram showing another example of an additional detailed circuit constitution of the storage device when an embodiment of the present invention is applied.

The storage device shown in FIG. 10 differs from the storage device shown in FIG. 9 in that, in the disk control unit 191, highly integrated chips (LSI) (197, 199, 201, and 203) that singly function as a port-control logic/FC control logic circuit for two ports are arranged on a plurality (two in FIG. 10) of disk control substrates 193 and 195. As shown in FIG. 9, a port control signal cable that connects each of the two port control logic/FC control logic circuits contained in a single chip with the port control circuit of each chip disposed on the disk drive substrate is constituted as a 2-port control signal cable, as indicated by the reference symbols 200, 202, 204, and 206, between the disk control unit 191 and the disk drive unit 113. In FIG. 10, a redundant constitution is rendered in which respective two port control logic/FC control logic circuits are allocated to each port (0 to 3) (chips 197 and 201 are allocated to port 0 and port 1 respectively, and chips 199 and 203 are allocated to port 2 and port 3 respectively).

Further, in FIG. 10, the same reference symbols are assigned to the same parts as those shown in FIG. 9, and, therefore, a detailed description of these parts is omitted.

According to the above constitution, in addition to it being possible to afford the same effects as those of the constitution shown in FIG. 9, by employing a highly integrated chip for the chip (LSI) constituting the disk control unit 191, the mounting surface of the chips (197, 199, 201, and 203) on the disk control substrates (193, 195) can be reduced, and hence miniaturization and cost reductions for the storage device are feasible.

According to the constitution shown in FIG. 9 or FIG. 10, the FC control signal cables and port control signal cables for connecting the port control logic/FC control logic circuits (97 to 111) shown in FIG. 9 or the chips (197 to 203) shown in FIG. 10 with the port bypass circuits (145$_1$ to 145$_8$) are isolated, and the port control logic/FC control logic circuits (97 to 111) or the chips (197 to 203) shown in FIG. 10 can be mounted highly densely on the disk control substrates(93, 95, 193, 195) while securing signal isolation accuracy when an FC control signal is impaired due to cable faults.

Furthermore, the number of cables for connecting the disk control substrates (93, 95, 193, 195) and the disk drive substrates (119, 121, 123, 125, 127, 129, 131, 133) can be reduced to half the number of conventional cables used and cable ducts or similar can be reduced, meaning that miniaturization of the storage device is possible.

Moreover, because the number of cables used to connect the disk control substrates (93, 95, 193, 195) and the disk drive substrates (119, 121, 123, 125, 127, 129, 131, 133) can be reduced, the cable wiring, which easily grows complex, can be simplified, and hence the erroneous wiring of cables can be prevented.

In addition, depending on the specifications that the user requires for the storage device, in a state where the same disk control substrates (93, 95, 193, and 195) and the same disk drive substrates (119, 121, 123, 125, 127, 129, 131, 133) are used, the addition of a new disk drive substrate or the like can be varied. It is thus possible to provide a storage device with a flexible constitution.

A preferred embodiment of the present invention and modified examples thereof were described hereinabove but merely serve as examples to illustrate the present invention, there being no intention to restrict the scope of the present invention to this embodiment or these modified examples alone. The present invention can also be implemented by means of a variety of other embodiments.

What is claimed is:

1. A storage device that is communicably connected to a host computer, comprising:
    a plurality of disk units for storing data from the host computer, each of the disk units comprising a plurality of hard disks and being connected to one of a plurality of ports;
    a plurality of disk unit control units for controlling the disk units, each of the disk unit control units being provided for each of the ports and comprising a memory for temporarily holding data from the host computer; and
    a plurality of control signal transmission cables for transmitting control signals from the disk unit control units to the disk units,
    wherein at least one of the control signal transmission cables is connected to at least two of the disk unit control units and transmits different control signals to at least two of the disk units,
    wherein each of the disk units further comprises a port control circuit and a port bypass circuit in addition to the plurality of hard disks,
    wherein each of the disk unit control units further comprises:
    a port control logic circuit for outputting a port control signal to the port control circuit of each of the disk units,
    a fiber channel control logic circuit for outputting a fiber channel control signal to the port bypass circuit of each of the disk units,
    wherein said at least one of the control signal transmission cables is a port control signal cable for transmitting different port control signals from the port control logic circuits of said at least two of the disk unit control units to the port control circuits of said at least two of the disk units.

2. A storage device that is communicably connected to a host computer, comprising:
    a plurality of disk units for storing data from the host computer, each of the disk units comprising a plurality of hard disks and being connected to one of a plurality of ports;
    a plurality of disk unit control units for controlling the disk units, each of the disk unit control units being provided for each of the ports and comprising a memory for temporarily holding data from the host computer; and
    a plurality of control signal transmission cables for transmitting control signals from the disk unit control units to the disk units,
    wherein at least one of the control signal transmission cables is connected to at least two of the disk unit control units and transmits different control signals to at least two of the disk units,
    wherein each of the disk units further comprises a port control circuit and a port bypass circuit in addition to the plurality of hard disks,
    wherein each of the disk unit control units further comprises:
    a port control logic circuit for outputting a port control signal to the port control circuit of each of the disk units,
    a fiber channel control logic circuit for outputting a fiber channel control signal to the port bypass circuit of each of the disk units, and,
    wherein said at least one of the control signal transmission cables is a fiber channel control signal cable for transmitting different fiber channel control signals from the fiber channel control logic circuits of said at least two of the disk unit control units to the port bypass circuits of said at least two of the disk units.

3. A storage device that is communicably connected to a host computer, comprising:
    a plurality of disk units for storing data from the host computer, each of the disk units comprising a plurality of physical devices and being connected to one of a plurality of ports;
    a plurality of disk unit control units for controlling the disk units, each of the disk unit control units being provided for each of the ports; and
    one or more control signal transmission cables for transmitting control signals from the disk unit control units to the disk units,
    wherein at least one of the one or more control signal transmission cables is connected to at least two of the disk unit control units, and transmits different control signals to at least two of the disk units,
    wherein each of the disk units further comprises a port control circuit and a port bypass circuit in addition to the plurality of physical devices,
    wherein each of the disk unit control units further comprises:
    a port control logic circuit for outputting a port control signal to the port control circuit of each of the disk units, and
    a fiber channel control logic circuit for outputting a fiber channel control signal to the port bypass circuit of each of the disk units,
    wherein said at least one of the one or more control signal transmission cables is a port control signal cable for transmitting different port control signals from the port control logic circuits of said at least two of the disk unit control units to the port control circuits of said at least two of the disk units.

4. A storage device that is communicably connected to a host computer, comprising:
a plurality of disk units for storing data from the host computer, each of the disk units comprising a plurality of physical devices and being connected to one of a plurality of ports;
a plurality of disk unit control units for controlling the disk units, each of the disk unit control units being provided for each of the ports; and
one or more control signal transmission cables for transmitting control signals from the disk unit control units to the disk units,
wherein at least one of the one or more control signal transmission cables is connected to at least two of the disk unit control units, and transmits different control signals to at least two of the disk units,
wherein each of the disk units further comprises a port control circuit and a port bypass circuit in addition to the plurality of physical devices,
wherein each of the disk unit control units further comprises:
a port control logic circuit for outputting a port control signal to the port control circuit of each of the disk units; and
a fiber channel control logic circuit for outputting a fiber channel control signal to the port bypass circuit of each of the disk units, and,
wherein said at least one of the one or more control signal transmission cables is a fiber channel control signal cable for transmitting different fiber channel control signals from the fiber channel control logic circuits of said at least two of the disk unit control units to the port bypass circuits of said at least two of the disk units.

5. A storage device comprising:
a plurality of disk units for storing data, each of the disk units comprising a plurality of physical devices, said disk units being connected to a plurality of ports;
a plurality of disk unit control units for controlling the disk units, each of the disk unit control units being provided for each of the ports; and
one or more control signal transmission cables for transmitting control signals from the disk unit control units to the disk units,
wherein at least one of the one or more control signal transmission cables is connected to at least two of the disk unit control units, and transmits different control signals to at least two of the disk units,
wherein each of the disk units further comprises a port control circuit and a port bypass circuit in addition to the plurality of physical devices,
wherein each of the disk unit control units further comprises:
a port control logic circuit for outputting a port control signal to the port control circuit of each of the disk units, and
a fiber channel control logic circuit for outputting a fiber channel control signal to the port bypass circuit of each of the disk units,
wherein said at least one of the one or more control signal transmission cables is a port control signal cable for transmitting different port control signals from the port control logic circuits of said at least two of the disk unit control units to the port control circuits of said at least two of the disk units.

6. A storage device comprising:
a plurality of disk units for storing data, each of the disk units comprising a plurality of physical devices, said disk units being connected to a plurality of ports;
a plurality of disk unit control units for controlling the disk units, each of the disk unit control units being provided for each of the ports; and
one or more control signal transmission cables for transmitting control signals from the disk unit control units to the disk units,
wherein at least one of the one or more control signal transmission cables is connected to at least two of the disk unit control units, and transmits different control signals to at least two of the disk units,
wherein each of the disk units further comprises a port control circuit and a port bypass circuit in addition to the plurality of physical devices,
wherein each of the disk unit control units further comprises:
a port control logic circuit for outputting a port control signal to the port control circuit of each of the disk units, and
a fiber channel control logic circuit for outputting a fiber channel control signal to the port bypass circuit of each of the disk units, and,
wherein said at least one of the one or more control signal transmission cables is a fiber channel control signal cable for transmitting different fiber channel control signals from the fiber channel control logic circuits of said at least two of the disk unit control units to the port bypass circuits of said at least two of the disk units.

* * * * *